United States Patent [19]

Pellet et al.

[11] 4,261,811

[45] Apr. 14, 1981

[54] REFORMING WITH AN IMPROVED RHENIUM-CONTAINING CATALYST

[75] Inventors: Regis J. Pellet; Michael J. Gradassi, both of Wheaton, Ill.; Ralph J. Bertolacini, Chesterton, Ind.

[73] Assignee: Standard Oil Company (Indiana), Chicago, Ill.

[21] Appl. No.: 27,909

[22] Filed: Apr. 6, 1979

[51] Int. Cl.³ ............................................. C10G 35/08
[52] U.S. Cl. .................................................. 208/139
[58] Field of Search .......................................... 208/139

[56] References Cited

U.S. PATENT DOCUMENTS

| | | | |
|---|---|---|---|
| 3,173,856 | 3/1965 | Burton et al. | 208/138 |
| 3,415,737 | 12/1968 | Kluksdahl | 208/139 |
| 4,124,491 | 11/1978 | Antos et al. | 208/139 |

Primary Examiner—Curtis R. Davis
Attorney, Agent, or Firm—James L. Wilson; William T. McClain; William H. Magidson

[57] ABSTRACT

An improved process for the reforming of a hydrocarbon stream, which process comprises contacting said hydrocarbon stream under reforming conditions and in the presence of hydrogen with a catalyst which comprises platinum, rhenium, a small amount of palladium, and combined halogen on a refractory inorganic oxide, such as an alumina, and which has not been presulfided. The improvement comprises a rhenium-containing catalyst which has not been presulfided and which contains a small amount of palladium, i.e., about 0.05 wt. % to about 1 wt. % palladium. The feedstock being reformed can contain up to about 50 ppm sulfur.

20 Claims, 5 Drawing Figures

REFORMING WITH AN IMPROVED RHENIUM-CONTAINING CATALYST

BACKGROUND OF THE INVENTION

This invention is related to the conversion of hydrocarbon streams. More particularly, it is related to the reforming of hydrocarbon fractions over catalysts containing platinum and rhenium.

The reforming of hydrocarbon streams is one of the important petroleum refining processes that may be employed to provide high-octane-number hydrocarbon blending components for gasoline. In the typical reforming process, the reactions comprise dehydrogenation reactions, isomerization reactions, and hydrocracking reactions. The dehydrogenation reactions include the dehydrogenation of cyclohexanes to aromatics, the dehydroisomerization of alkylcyclopentanes to aromatics, the dehydrogenation of paraffins to olefins, and the dehydrocyclization of paraffins and olefins to aromatics. The isomerization reactions include isomerization of n-paraffins to isoparaffins, the hydroisomerization of olefins to isoparaffins, the isomerization of alkylcyclopentanes to cyclohexanes, and the isomerization of substituted aromatics. The hydrocracking reactions include hydrocracking of paraffins and hydrodesulfurization. Adequate discussion of the reactions occurring in a reforming reaction zone are presented in CATALYSIS, Vol. VI, P. H. Emmett, editor, Reinhold Publishing Corporation, 1958, pages 497–498, and PETROLEUM PROCESSING, R. J. Hengstebeck, McGraw-Hill Book Company, Inc., 1959, pages 179–184.

It is well known by those skilled in the art that several catalysts are capable of reforming naphthas and hydrocarbons that boil in the gasoline boiling range. Although reforming can be carried out through the use of several types of catalysts, namely, molybdena-on-alumina catalysts, chromium-oxides-on-alumina catalysts, platinum-halogen-on-alumina catalysts, platinum-rhenium-halogen-on-alumina catalysts, and platinum-aluminosilicate-material-alumina catalysts, the catalysts employing platinum as a hyrogenation component and rhenium as a promoter are generally employed today in the reforming processes of the petroleum industry.

Kluksdahl, in U.S. Pat. No. 3,415,737, discloses the platinum-rhenium catalyst and its use for the reforming of hydrocarbon fractions. He provides that the sulfur content of the system should be minimal and that the catalyst should be presulfided to prevent run-away temperatures due to excessive hydrocracking.

It is known in the art that a reforming catalyst may contain more than one Group VIII metal, for example, platinum and palladium. In U.S. Pat. No. 3,173,856, Burton, et al., teach reforming with a catalyst comprising platinum and/or palladium on eta-alumina. In U.S. Pat. No. 3,554,901, Kominami, et al., teach the aromatization of hydrocarbons at a temperature of 400° C. to 650° C. with a catalyst that is prepared by impregnating a carrier, such as silica, alumina, or silica-alumina, with a solution containing 0.1 to 1 wt.% platinum, 0.1 to 1 wt.% palladium, and 5 to 25 wt.% chromium oxide, and treating the impregnated material with hydrogen. In U.S. Pat. No. 3,694,348, Bursian, et al., disclose the aromatization of hydrocarbons at a temperature of 400° C. to 550° C. and a pressure of up to 20 atmospheres over platinum-on-alumina catalyst containing 0.1 to 5 wt.% palladium and 0.1 to 5 wt.% of at least one element from the scandium subgroup of Group III of the Periodic Table of Elements and/or the zirconium subgroup of Group IV. In Example 5 of this latter patent, there is employed a catalyst containing 0.6 wt.% platinum and 0.2 wt.% palladium on alumina. In each of the patents cited in this paragraph, the catalyst does not contain rhenium and there is no disclosure of the sulfiding of the catalyst for the control of hydrocracking.

In U.S. Pat. No. 4,124,490, Collins, et al., teach reforming that employs a catalyst comprising a support, at least one platinum-group metal component, and at least one rhenium component at two different temperature levels. This patent does not provide any examples of a catalyst that contains both platinum and palladium and does not consider the sulfiding of the catalyst to control hydrocracking.

In U.S. Pat. No. 4,124,491, Antos, et al., disclose reforming with a selectively sulfided acidic multi-metallic catalyst comprising one or more Group VIII metals, a sulfided rhenium component, a halogen component, and a Ziegler alumina. The patent teaches that the catalyst may contain platinum, iridium, rhodium, or palladium; platinum and iridium; and platinum and rhodium. It does not provide any catalyst example wherein both platinum and palladium are components of the catalyst. Furthermore, it requires a selective sulfiding of the catalyst.

There has now been found a process for the reforming of petroleum hydrocarbon streams, which process employs an improved rhenium-containing catalyst.

SUMMARY OF THE INVENTION

Broadly, according to the present invention, there is provided an improved process for the reforming of a hydrocarbon stream, which process comprises contacting said stream under reforming conditions and in the presence of hydrogen with a catalyst which comprises platinum, rhenium, a small amount of palladium, and combined halogen on a refractory inorganic oxide and which has not been presulfided.

The process can be used advantageously to reform either a hydrocarbon stream that does not contain a substantial amount of sulfur or a stream that contains up to 50 ppm of sulfur.

The palladium is present typically in the catalyst in an amount that is within the range of about 0.05 wt.% to about 1 wt.%, calculated as the metal and based upon the weight of the catalyst.

The improvement of this process comprises a rhenium-containing catalyst that has not been presulfided and that contains a small amount of palladium.

BRIEF DESCRIPTION OF THE DRAWINGS

Five figures are attached hereto.

DESCRIPTION AND PREFERRED EMBODIMENTS

Figure 1:
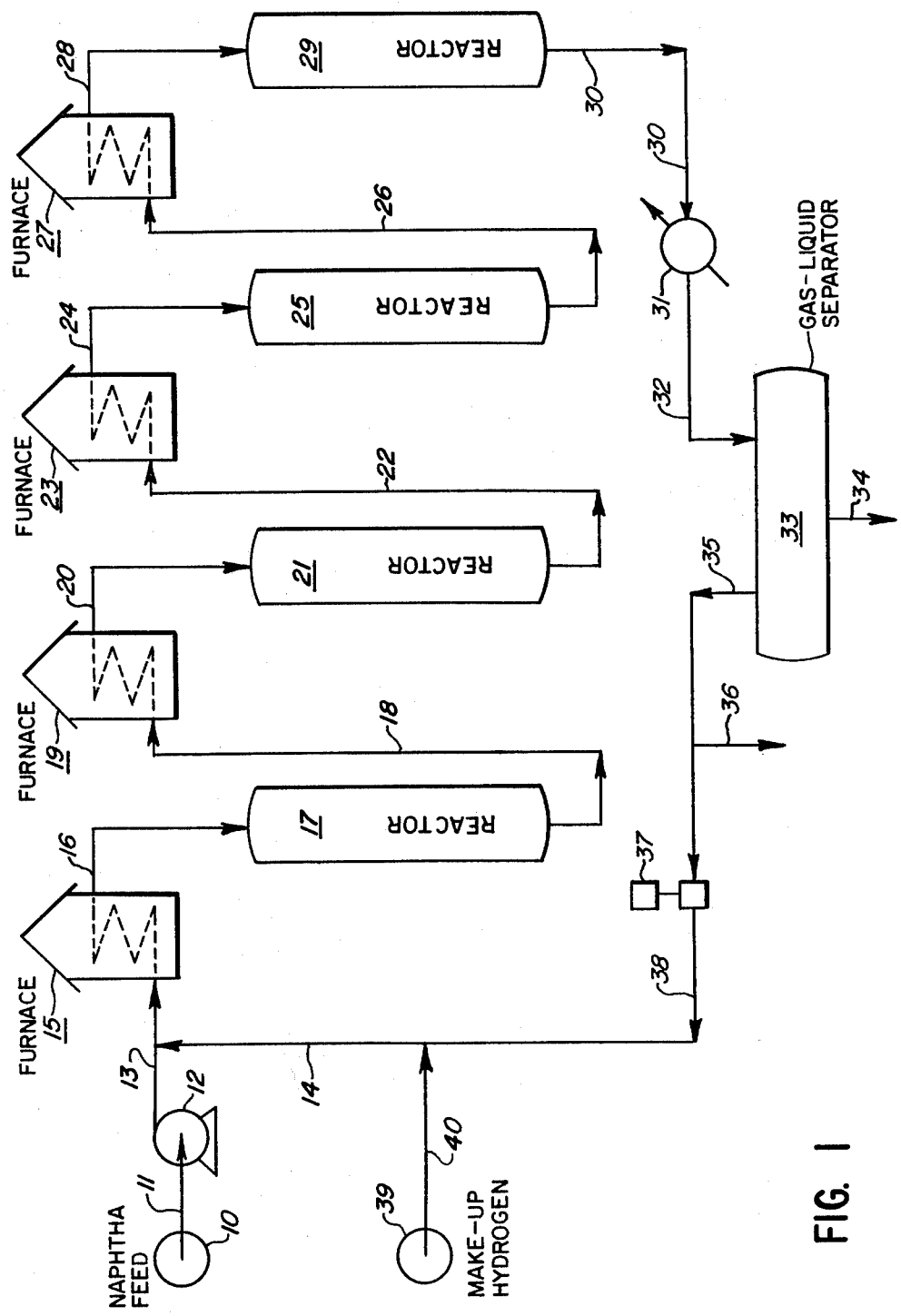
FIG. 1 presents a simplified schematic flow diagram of a preferred embodiment of the process of the present invention, wherein the improved catalyst of the present invention is employed.

The highly mechanized society of today requires an increasing demand for very-high-octane-number motor fuels. One of the chief processes for achieving such motor fuels is the reforming process. Typically, the reforming process of today is a process that employs a catalyst containing both platinum and rhenium as active metal components thereof. Such catalysts provide relatively long catalyst life interspersed with infrequent regenerations. However, there is a disadvantage to the use of a reforming catalyst that contains both platinum and rhenium as active components. This disadvantage is that the catalyst must be carefully sulfided prior to its use in order that excessive hydrocracking does not occur during the first part of the reforming run. Such presulfiding is rather difficult to achieve commercially and often does not provide the expected control of the initial hydrocracking.

The process of the present invention is not hampered by the need for the control of initial hydrocracking at the start-up of the run. The catalyst need not be presulfided; yet detrimental excessive hydrocracking does not occur during the initial stages of the process of the present invention.

The process of the present invention is especially advantageous for the production of high-octane-number blending components for motor fuels by means of the reforming of naphthas and other hydrocarbon streams boiling in the gasoline boiling range. It may be employed suitably to produce high-octane-number blending components for unleaded and/or low-lead motor fuels.

The process of the present invention may be employed to reform a feedstock which is a member selected from the group consisting of a virgin naphtha, a cracked naphtha, a hydrocarbon fraction boiling in the gasoline boiling range, and mixtures thereof. It may also be used to reform partially-reformed naphthas and other hydrocarbon streams. A naphtha will exhibit a boiling range of about 70° F. (21.1° C.) to about 500° F. (260° C.), preferably, about 180° F. (82° C.) to about 400° F. (204° C.). The gasoline boiling range comprises temperatures of about 120° F. (49° C.) to about 420° F. (216° C.), preferably, about 140° F. (60° C.) to about 380° F. (193° C.). The partially-reformed hydrocarbon streams will exhibit an unleaded research octane number within the range of about 75 to about 95. As used herein, the term "partially-reformed" refers to those streams that have been reformed to an unleaded research octane number of about 75 to about 95.

Since many of the above feedstocks may contain appreciable amounts of nitrogen and sulfur compounds, which can be deleterious to the catalyst in a reforming process, such feedstock is often subjected to a suitable hydrodesulfurization and/or hydrodenitrogenation treatment, such as hydrofining, prior to the use of that particular feedstock in the process of the present invention. Such treatment reduces both the nitrogen and sulfur levels to tolerable limits. However, it is to be emphasized that the process of the present invention can be used suitably to reform a hydrocarbon stream that contains as much as 50 ppm of sulfur by weight. The process can be used preferably to reform a hydrocarbon stream that contains as much as 35 ppm sulfur by weight.

Broadly, according to the process of the present invention, there is provided an improved process for reforming a hydrocarbon stream. This process comprises contacting the hydrocarbon stream under reforming conditions and in the presence of hydrogen with a catalyst which comprises platinum, rhenium, a small amount of palladium, and combined halogen on a suitable refractory inorganic oxide and which has not been presulfided. The improvement of this process comprises a catalyst which has not been presulfided and which contains a small amount of palladium.

The catalyst that is employed in the process of the present invention comprises platinum, rhenium, a combined halogen, and palladium on a suitable refractory inorganic oxide. The platinum is present in an amount within the range of about 0.05 wt.% to about 1 wt.%, preferably, in an amount within the range of about 0.1 wt.% to about 0.8 wt.%. The rhenium is present in an amount within the range of about 0.03 wt.% to about 1 wt.%, preferably, in an amount within the range of about 0.1 wt.% to about 0.8 wt.%. The palladium is present in an amount within the range of about 0.05 wt.% to about 1 wt.%, preferably, in an amount within the range of about 0.1 wt.% to about 0.8 wt.%. The combined halogen is present in an amount within the range of about 0.1 wt.% to about 1 wt.%, preferably, in an amount within the range of about 0.3 wt.% to about 0.9 wt.%. For each of these amounts, the values presented are based upon the weight of the catalyst. The amount of each of the metals is calculated in terms of the element.

A suitable refractory inorganic oxide that may be employed as the catalyst support material is a catalytically active alumina, such as gamma-alumina, eta-alumina, or mixtures thereof. Such alumina should have an average pore diameter of about 70 Angstrom units [A] (7 nm) to about 200 A (20 nm), or larger. The alumina should have a surface area of at least 150 m$^2$/gm. Suitably, the surface area of the alumina should be within the range of about 200 m$^2$/gm to about 800 m$^2$/gm.

It is contemplated that the catalyst that is employed in the process of the present invention can contain also a crystalline aluminosilicate material. Such crystalline aluminosilicate material is a large-pore aluminosilicate material and preferably possesses pores having diameters within the range of about 5 A (0.5 nm) to about 15 A (1.5 nm). A preferred crystalline aluminosilicate material is either mordenite or faujasite. Suitably, the aluminosilicate material is suspended in and distributed throughout a matrix of the porous refractory inorganic oxide. The aluminosilicate material may be present in an amount of about 0.2 wt.% to about 25 wt.%, based upon the weight of the support material. Preferably, the large-pore crystalline aluminosilicate material has been cation-exchanged with a member selected from the group consisting of hydrogen, a hydrogen-ion precursor, such as ammonium cation, a rare-earth-metal cation, other metal cations, and mixtures thereof to reduce the alkali-metal content or alkaline-earth-metal content of the crystalline alumino-silicate material to a level that is less than 1 wt.%, calculated as the metal and based upon the weight of the crystalline aluminosilicate material.

As is pointed out hereinabove, the catalyst that is employed in the process of the present invention also contains a combined halogen. Suitable halogens are chlorine and fluorine. The preferred combined halogen is chlorine.

The catalyst that is employed in the process of the present invention can be prepared in various ways that are well known in the art. For example, soluble compounds of the various metals and the halogen can be added to a sol or gel of the refractory inorganic oxide. This composition is thoroughly blended and the sol or gel mixture is subsequently co-gelled by the addition of a dilute ammonia solution. The resulting co-gelled material is then dried and calcined. If an alumino-silicate material is to be a component of the catalyst, it can be added in a finely-divided form to the sol or gel of the refractory inorganic oxide, along with suitable compounds of the metals and the halogen, and the resulting composition can be thoroughly blended prior to co-gelling, drying, and calcining. Alternatively, the crystalline aluminosilicate material in particulate form can be physically admixed with particles of the refractory inorganic oxide, such as alumina, with the metals being added by a suitable method, such as impregnation, either before or after such mixing. In another method of preparation, the refractory inorganic oxide is gelled, dried, pelleted, calcined, and cooled, and the resulting material is then impregnated with one or more solutions of the various metal components and the halogen. Suitable calcination conditions comprise a temperature in the range of about 900° F. (482° C.) to about 1,100° F. (593° C.) and a calcination time of about 1 hour to about 20 hours. Suitable drying conditions comprise a temperature in the range of about 200° F. (93° C.) to about 400° F. (204° C.) and a drying time of about 3 hours to about 30 hours. Preferably, drying conditions comprise a temperature of about 250° F. (121° C.) for about 8 hours to about 16 hours and calcination conditions comprise a temperature of about 1,000° F. (538° C.) for about 2 hours to about 6 hours. The combined halogen may be incorporated into the catalyst as a halide of a metal, or as a halogen acid, or as a halide salt.

Typical operating conditions of the reforming process of the present invention comprise an inlet temperature of about 900° F. (482° C.) to about 1,020° F. (549° C.), a pressure of about 50 psig (446 KPa) to about 1,000 psig (6,996 KPa), a weight hourly space velocity (WHSV) of about 0.5 weight unit of hydrocarbon per hour per weight unit of catalyst to about 10 weight units of hydrocarbon per hour per weight unit of catalyst, and a hydrogen addition rate of about 1,500 standard cubic feet per barrel [SCFB] (267 m$^3$/m$^3$) to about 15,000 SCFB (2,670 m$^3$/m$^3$). Preferred operating conditions comprise an inlet temperature of about 940° F. (504° C.) to about 980° F. (527° C.), a pressure of about 50 psig (446 KPa) to about 300 psig (2,170 KPa), a WHSV of about 1 weight unit of hydrocarbon per hour per weight unit of catalyst to about 8 weight units of hydrocarbon per hour per weight unit of catalyst, and a hydrogen addition rate of about 3,000 SCFB (534 m$^3$/m$^3$) to about 10,000 SCFB (1,780 m$^3$/m$^3$).

The process of the present invention can be carried out in any of the conventional types of equipment known to the art. One may, for example, employ catalysts in the form of pills, pellets, granules, broken fragments, or various special shapes, disposed as one or more fixed beds within one or more reaction zones, and the charging stock may be passed therethrough in the liquid, vapor, or mixed phase, and in either upward or downward flow. Alternatively, the catalyst may be in a suitable form for use in moving beds, in which the charging stock and catalyst are preferably passed in countercurrent flow; or in fluidized-solid processes, in which the charging stock is passeed upward through a turbulent bed of finely-divided catalyst; or in the suspensoid process, in which the catalyst is slurried in the charging stock and the resulting mixture is conveyed into the reaction zone. A fixed-bed reforming process is exemplified by Ultraforming (PETROLEUM ENGINEER, Vol. XXVI, No. 4, April 1954, at page C-35). The reaction products from the foregoing processes are removed from the reaction zones and fractionated to recover the various components thereof. The hydrogen and unconverted materials are recycled as desired, the excess hydrogen produced in a reformer conveniently being utilized in the hydrodesulfurization of the feed, if such hydrodesulfurization is needed.

Unwanted products in the reforming of petroleum hydrocarbon streams are light hydrocarbon gases and coke. Such products and other compounds, such as polynuclear aromatics and heavy hydrocarbons, may result in coke. As the operation progresses, a substantial amount of coke accumulates on the surface of the catalyst resulting in an increasingly rapid rate of catalyst deactivation. Consequently, the coke must be removed periodically from the surface. Such coke removal may be accomplished through a coke-burn treatment wherein the coked catalyst is contacted with an oxygen-containing gas at selected temperatures. Typically, the gas will contain oxygen within the range of about 1 vol.% to about 21 vol.%. The concentration of oxygen in the gas should be maintained at a level which will not result in the production of temperatures that will be in excess of 1,100° F. (593° C.), preferably, in excess of 1,050° F. (566° C.).

Typically, the process of the present invention can be employed as a semi-regenerative reforming process or as a regenerative or cyclic process. In a semi-regenerative reforming process, the flow of hydrocarbons is stopped to all of the reactors in the system and the catalyst in each of the reactors is regenerated. In a regenerative or cyclic reforming system, one of the reactors is removed from the system and is replaced by an auxiliary reactor. Reforming of hydrocarbons continues in such a system, while catalyst in the reactor that has been removed from the system is regenerated. The auxiliary reactor is known as a swing reactor.

A preferred embodiment of the process of the present invention is depicted in the accompanying FIG. 1. This figure is a simplified schematic flow diagram of the preferred embodiment. It does not include certain auxiliary equipment, such as heat exchangers, valves, pumps, compressors, and associated equipment, which would be needed in various places along the flow path of the process in addition to the pump and compressor that are depicted in the drawing. Such additional auxiliary equipment and its location requirements would be quickly recognized by one having ordinary skill in the art. Consequently, such auxiliary equipment is not shown in the figure.

In the embodiment of the process of the present invention that is represented in the accompanying FIG. 1, a naphtha having a boiling range of about 160° F. (71° C.) to about 400° F. (204° C.), preferably, about 180° F. (82° C.) to about 380° F. (193° C.), is obtained from source 10. This naphtha contains 35 ppm sulfur. However, it could satisfactorily contain sulfur in an amount within the range of 0 ppm to about 50 ppm. This feedstock is passed through line 11 into pump 12, which pumps the hydrocarbons through line 13. Hydrogen-containing recycle gas is introduced into line 13 via line 14 to be mixed with the hydrocarbons in line 13. The resulting hydrogen-hydrocarbon mixture passes through line 13, furnace 15, and line 16 into the top of reactor 17. The material is introduced into reactor 17 at a temperature of about 940° F. (504° C.) to about 980° F. (527° C.). The outlet temperature of reactor 17 is approximately 800° F. (427° C.) and the pressure in reactor 17 is within the range of about 160 psig (1,205 KPa) to about 320 psig (2,308 KPa).

The effluent from reactor 17 passes through line 18, furnace 19, and line 20 into the top of reactor 21. Sufficient heat is introduced into this hydrogen-hydrocarbon stream by furnace 19 so that the temperature at the inlet of reactor 21 is about 960° F. (516° C.) to about 1,000° F. (538° C.). The outlet temperature of reactor 21 is approximately 855° F. (457° C.) and the pressure in reactor 21 is within the range of about 140 psig (1,067 KPa) to about 300 psig (2,170 KPa).

The effluent from reactor 21 passes through line 22, furnace 23, and line 24 into the top of reactor 25. This effluent is heated in furnace 23 so that the inlet temperature of reactor 25 is about 960° F. (516° C.) to about 1,000° F. (538° C.). The outlet temperature of reactor 25 is approximately 940° F. (504° C.) and the pressure in reactor 25 is within the range of about 120 psig (929 KPa) to about 280 psig (2,032 KPa).

The effluent from reactor 25 passes through line 26, furnace 27, and line 28 into the top of reactor 29. This hydrocarbon effluent is heated in furnace 27 so that the inlet temperature of reactor 29 is about 980° F. (527° C.) to about 1,020° F. (549° C.). The outlet temperature of reactor 29 is about 950° F. (510° C.) and the pressure in reactor 29 is within the range of about 100 psig (791 KPa) to about 260 psig (1,894 KPa).

Reactors 17, 21, 25, and 29 all contain a catalyst which has not been presulfided and which comprises about 0.05 wt.% to about 1 wt.% platinum, about 0.03 wt.% to about 1 wt.% rhenium, about 0.05 wt.% to about 1 wt.% palladium, and about 0.1 wt.% to about 1 wt.% combined chlorine on a gamma-alumina support, each amount being based upon the total catalyst weight.

Not shown in the figure is a fifth reactor, which reactor contains a quantity of the catalyst that is employed in the other reactors. This additional reactor is employed as a swing reactor for each of the four reactors in this system when the catalyst in a particular reactor has become deactivated and must be regenerated. The reactor containing this deactivated catalyst is removed from the system and is replaced by the swing reactor in order that the reforming system may be operated continuously, even though the deactivated catalyst has been removed from the system and is being regenerated.

The hydrogen-to-hydrocarbon ratio and the WHSV employed in the various reactors fall within the respective ranges of values as expressed hereinabove.

The effluent from reactor 29 passes through line 30, water cooler 31, and line 32 into gas-liquid separator 33. Gas-liquid separator 33 is operated at a pressure of about 80 psig (653 KPa) to about 240 psig (1,756 KPa) and at a temperature of about 100° F. (38° C.). Liquid product is removed from separator 33 through line 34 to be sent to a suitable product recovery system from which a high-octane product is obtained. Gaseous material is removed from separator 33 through line 35. A portion of this gas is removed from the system through line 36 to be used at other refinery units. The remainder of the hydrogen-hydrocarbon gas in line 35 is compressed by compressor 37 to be sent through lines 38 and 14 as hydrogen-hydrocabon recycle gas. When necessary, make-up hydrogen gas may be introduced into the system from source 39 via line 40.

It is contemplated that in a second embodiment of the process of the present invention, which second embodiment can be represented also by the simplified schematic flow diagram depicted in FIG. 1, two catalysts are employed. In this second embodiment, Reactors 17 and 21 contain a first catalyst, which comprises about 0.05 wt.% to about 1 wt.% platinum and about 0.1 wt.% to about 1 wt.% combined halogen, preferably, chlorine, on an alumina carrier and which does not contain either rhenium or palladium, and Reactors 25 and 29 contain a second catalyst, which second catalyst is an embodiment of the catalyst of the process of the present invention as described hereinabove. The swing reactor (not shown) employs either the second catalyst or a mixture of the two catalysts. The operating conditions employed in this embodiment fall within the ranges of values set forth hereinabove. In this latter embodiment, either a virgin naphtha or a partially-reformed hydrocarbon stream may be employed as the hydrocarbon feedstock.

Accordingly, there is provided an improved process for the reforming of a hydrocarbon stream selected from the group consisting of naphthas and hydrocarbon fractions boiling in the gasoline boiling range, which process comprises contacting said hydrocarbon stream under reforming conditions and in the presence of hydrogen with a catalyst which comprises platinum, rhenium, a small amount of palladium, and combined halogen on a refractory inorganic oxide and which has not been presulfided. Detailed descriptions of the catalysts and feedstocks that can be used in this process are described hereinabove.

Moreover, there is provided, in a process for the reforming of a hydrocabon stream selected from the group consisting of naphthas and hydrocarbon fractions boiling in the gasoline boiling range wherein said stream is contacted under reforming conditions and in the presence of hydrogen with a catalyst comprising platinum, rhenium, and a combined halogen on a refractory inorganic oxide, the improvement which comprises a catalyst which has not been presulfided and which contains a small amount of palladium.

The following examples are presented to facilitate a better understanding of the present invention. They are presented for the purpose of illustration only and are not intended to limit the scope of the present invention.

EXAMPLE I

An embodiment of the catalyst that is employed in the process of the present invention was prepared. It is identified hereinafter as Catalyst A.

For this preparation, 100 gm of Aero 1000 alumina, obtained from the American Cyanamid Company, were used in the form of 20-to-45-mesh material, i.e., material that will pass through a 20-mesh screen (U.S. Sieve Series) but will be retained on a 45-mesh screen (U.S. Sieve Series). To this alumina was added an impregnating solution that had been prepared by incorporating 1.0 gm of $H_2PtCl_6$, 1.0 gm of $PdCl_2$, 60 drops of a commercial concentrated $HNO_3$ solution (about 70 wt.% $HNO_3$), and 4.1 gm of a rhenium-containing solution in 80 ml of distilled water. The rhenium-containing solution had been prepared by dissolving 9.8 gm of rhenium in 50 ml of 30% $H_2O_2$ solution and diluting with distilled water to obtain 100 gm of 9.8% rhenium solution. The $HNO_3$ was employd to help dissolve the $PdCl_2$.

The impregnated alumina was dried in air at a temperature of 250° F. (121° C.) overnight (a period of approximately 16 hours) and calcined at 1,000° F. (538° C.) for 3 hours.

Catalyst A was prepared to contain 0.4 wt.% platinum, 0.4 wt.% rhenium, 0.6 wt.% palladium, and 0.8 wt.% combined chlorine.

EXAMPLE II

A catalyst of the prior art was prepared by forming a composite of four samples of commercially-prepared platinum-rhenium reforming catalysts, which had been obtained from the American Cyanamid Company. Each of the 4 samples used in this composite was said by the manufacturer to contain 0.37 wt.% platinum and 0.37 wt.% rhenium. The composite was adjusted for combined chlorine content by impregnation thereof with aqueous hydrochloric acid, dried, and calcined as described hereinabove, and the resulting impregnated composite was found to contain 0.8 wt.% combined chlorine. This catalyst is identified hereinafter as Catalyst B.

EXAMPLE III

Catalysts A and B were tested in bench-scale pilot units for their reforming of two feedstocks, Feed A, which was essentially free of sulfur (less than 1 ppm sulfur), and Feed B, which contained 35 ppm sulfur.

Feed A is a desulfurized Mid-Continent naphtha, which has the properties shown hereinbelow in Table I. Feed B is the same desulfurized Mid-Continent naphtha to which had been added sufficient thiophene to provide a sulfur content of 35 ppm sulfur.

TABLE I

| PROPERTIES OF FEED A | |
|---|---|
| Gravity, °API | 55.1 |
| Specific Gravity | 0.7583 |
| Sulfur, ppm | 0.5 |
| Nitrogen, ppm | 0.7 |
| Combined chlorine, ppm | 1.0 |
| Water, ppm | 2 |
| Molecular weight | 113.8 |
| Hydrocarbon type, vol. % | |
| Paraffins | 48.7 |
| Naphthenes | 37.1 |
| Aromatics | 14.2 |
| Research Octane No., clear | 50.7 |

Each test was conducted in a bench-scale test unit employing an isothermal fixed bed of catalyst. The hydrocarbon feedstock and bottled hydrogen (once-through) were mixed and the resulting hydrogen-hydrocarbon mixture was charged to a reactor having an inside diameter of 0.622 inch. The reactor, which was 20 inches long, was immersed in a hot salt bath containing Du Pont HITEC. The temperatures in the reactor were determined by employing a manually-operated, concentric thermocouple, that was movable along the length of the reactor. The hydrocarbon feed was pumped by a positive-displacement Ruska pump.

The liquid product was collected in a high-pressure receiver. Liquid products were weighed and analyzed on a Hewlett-Packard research chromatograph, Model 5830A. The gas yield was measured by wet test meter and analyzed with a Varian Aerograph chromatograph, Series 1200. Research octane numbers were estimated by mass spectrometry.

Each catalyst sample was charged to a reactor in the form of 20-to-45-mesh (U.S. Sieve Series) material. A 20-gram sample of catalyst was used in each test. The catalyst bed was supported on a layer of 6.2 cc of 3.0 mm glass beads.

After the reactor containing the catalyst was placed in the test unit, the catalyst was pretreated. Catalyst A was pretreated by being subjected to an air soak for 1 hr at a temperature of 930° F. (499° C.) and an air flow rate of 0.0085 cu ft per hr, followed by a nitrogen purge, and then reduced with hydrogen for 1 hr at test pressure and a temperature of 930° F. (499° C.) and a hydrogen flow rate of 1.95 cu ft per hr. Catalyst B was pretreated as specified for Catalyst A, except that the air soak was followed by a sulfiding step prior to the hydrogen reduction. The sulfiding was conducted for 0.25 hr by means of a gas mixture comprising 8 vol.% hydrogen sulfide in hydrogen at a temperature of 930° F. (499° C.) and a pressure of 400 psig (2,859 KPa).

The results of these tests are presented hereinbelow in Table II. Catalyst A was tested in Test No. 1 for its ability to reform Feed A and in Test No. 2 for its ability to reform Feed B.

Catalyst B was tested in Test.No. 3 for its ability to reform Feed A and in Test No. 4 for its ability to reform Feed B.

The operating conditions that were employed in these tests were as follows: an outlet temperature of 930° F. (499° C.), unless otherwise specified; a pressure of 300 psig (2,170 KPa); a WHSV of 2.3 gm of hydrocarbon per hour per gm of catalyst; and a hydrogen-to-hydrocarbon mole ratio of 5. In each case, a 20-gm sample of catalyst was employed.

The results of the four above-mentioned tests are presented hereinafter in Tables II through V. The time on oil represents the time consumed during all of the periods for preceding samples plus half of the time of the period during which the particular sample was obtained.

Figure 2:
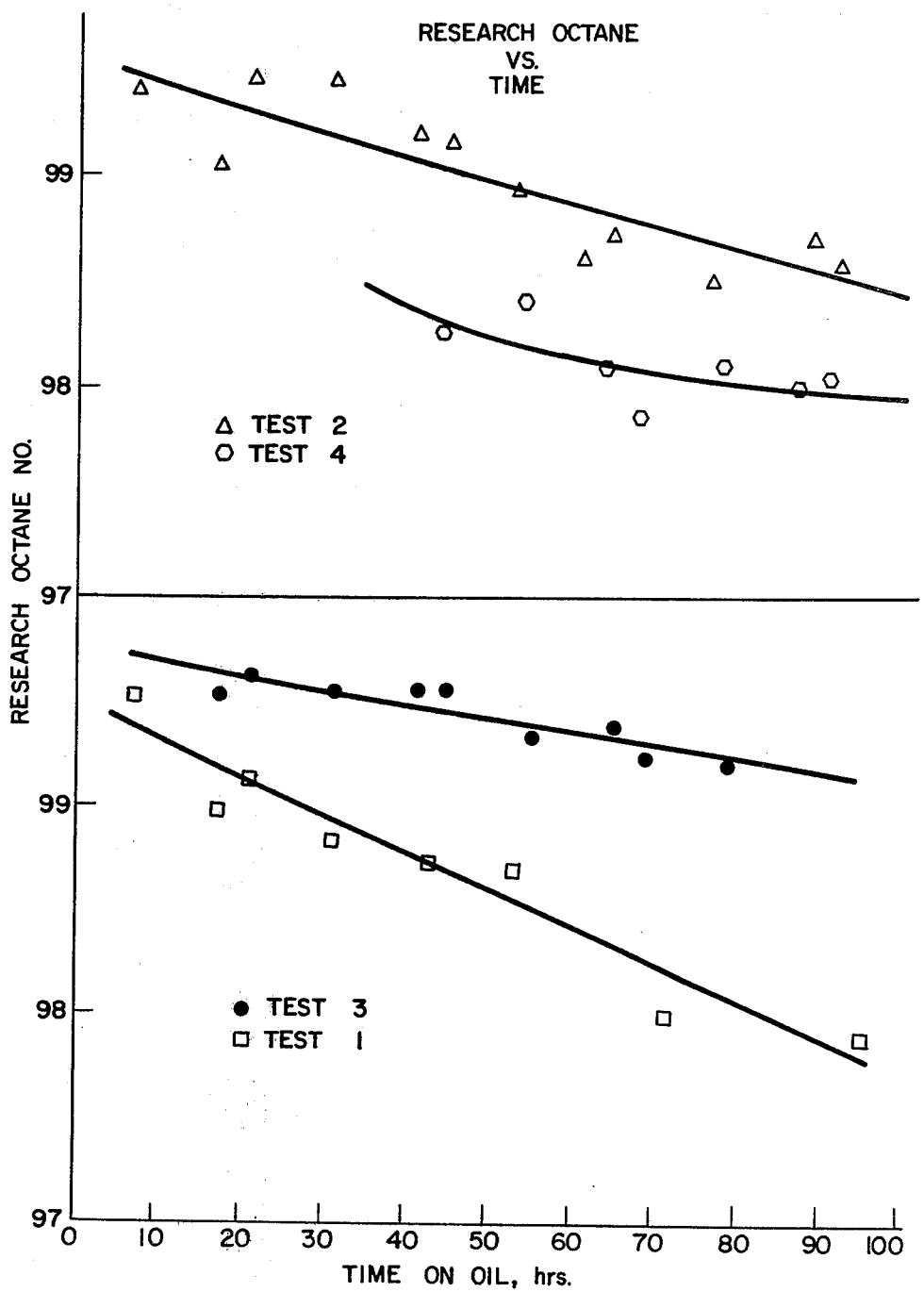
FIG. 2 presents the effect of sulfur in the hydrocarbon feed on the catalyst employed in the present invention and on a typical platinum-rhenium catalyst. The effect is shown in the change in research octane number. The lines in this and the following figures were obtained by linear regression of the data.

The accompanying FIG. 2 summarizes the results in terms of the relationship of Research Octane Number to time on oil for each of the Tests Nos. 1 through 4. This figure shows that the process of the present invention, represented by Tests Nos. 1 and 2, provides a superior initial performance, when the feedstock being reformed contains 35 ppm sulfur. In addition, it shows that the process of the present invention is more stable than a process employing a platinum-rhenium-catalyst that has been sulfided, when either process is treating a feedstock containing a substantial amount of sulfur.

EXAMPLE IV

Another embodiment of the catalyst that is employed in the process of the present invention was prepared. It is identified hereinafter as Catalyst C.

4,261,811

TABLE II

LIQUID PRODUCT FROM TEST NO. 1 CATALYST A; FEED A

| Sample No. | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| Time on Oil, hrs | 7.85 | 17.86 | 21.49 | 31.55 | 43.33 | 53.42 | 71.38 | 95.18 | 109.29 | 113.33 | 122.88 | 133.16 | 137.45 | 146.73 | 156.59 | 160.51 | 170.43 | 179.34 | 184.19 | 194.26 |
| Outlet Temp., °F. | 930 | 930 | 930 | 930 | 930 | 930 | 930 | 930 | 930 | 930 | 950 | 950 | 950 | 910 | 910 | 910 | 930 | 930 | 930 | 930 |
| Component | | | | | | | | Wt. % On Feed | | | | | | | | | | | | |
| Ethane | 0.06 | 0.07 | 0.06 | 0.06 | 0.05 | 0.06 | 0.05 | 0.06 | 0.05 | 0.04 | 0.05 | 0.06 | 0.04 | 0.04 | 0.05 | 0.05 | 0.05 | 0.05 | 0.04 | 0.07 |
| Propane | 0.55 | 0.59 | 0.54 | 0.51 | 0.49 | 0.50 | 0.43 | 0.46 | 0.43 | 0.40 | 0.40 | 0.50 | 0.44 | 0.35 | 0.41 | 0.40 | 0.45 | 0.46 | 0.41 | 0.54 |
| i-Butane | 0.64 | 0.67 | 0.63 | 0.59 | 0.58 | 0.57 | 0.49 | 0.52 | 0.51 | 0.48 | 0.46 | 0.61 | 0.56 | 0.40 | 0.44 | 0.44 | 0.52 | 0.53 | 0.49 | 0.59 |
| n-Butane | 1.28 | 1.31 | 1.25 | 1.20 | 1.18 | 1.16 | 1.01 | 1.07 | 1.05 | 1.00 | 0.92 | 1.23 | 1.15 | 0.88 | 0.97 | 0.94 | 1.09 | 1.10 | 1.02 | 1.19 |
| i-Pentane | 2.40 | 2.41 | 2.35 | 2.26 | 2.25 | 2.18 | 1.94 | 2.05 | 2.05 | 2.01 | 1.70 | 2.31 | 2.22 | 1.71 | 1.81 | 1.80 | 2.08 | 2.11 | 2.02 | 2.19 |
| n-Pentane | 1.58 | 1.55 | 1.52 | 1.48 | 1.47 | 1.44 | 1.28 | 1.34 | 1.33 | 1.31 | 1.15 | 1.58 | 1.53 | 1.09 | 1.12 | 1.12 | 1.35 | 1.36 | 1.31 | 1.40 |
| i-Hexane | 3.75 | 3.73 | 3.67 | 3.55 | 3.55 | 3.48 | 3.17 | 3.37 | 3.36 | 2.49 | 2.50 | 3.35 | 3.28 | 2.99 | 3.08 | 3.02 | 3.30 | 3.40 | 3.32 | 3.46 |
| n-Hexane | 1.41 | 1.40 | 1.39 | 1.37 | 1.37 | 1.35 | 1.25 | 1.32 | 1.32 | 1.33 | 0.96 | 1.30 | 1.28 | 1.28 | 1.30 | 1.30 | 1.34 | 1.35 | 1.32 | 1.37 |
| MCP | 0.60 | 0.61 | 0.60 | 0.59 | 0.60 | 0.58 | 0.55 | 0.61 | 0.62 | 0.62 | 0.33 | 0.43 | 0.44 | 0.77 | 0.76 | 0.76 | 0.64 | 0.63 | 0.63 | 0.65 |
| i-Heptane | 3.99 | 4.27 | 4.22 | 4.24 | 4.28 | 4.22 | 4.05 | 4.37 | 4.46 | 4.48 | 2.47 | 3.18 | 3.13 | 5.37 | 5.37 | 5.32 | 4.60 | 4.61 | 4.51 | 4.64 |
| n-Heptane | 1.11 | 1.27 | 1.26 | 1.17 | 1.19 | 1.17 | 1.14 | 1.23 | 1.28 | 1.28 | 0.68 | 0.87 | 0.86 | 1.75 | 1.84 | 1.70 | 1.33 | 1.32 | 1.31 | 1.34 |
| i-Octane | 2.47 | 2.80 | 2.76 | 2.94 | 3.03 | 3.00 | 3.09 | 3.42 | 3.60 | 3.57 | 1.34 | 1.63 | 1.62 | 5.93 | 5.72 | 5.70 | 3.81 | 3.75 | 3.72 | 3.87 |
| n-Octane | 0.54 | 0.61 | 0.60 | 0.65 | 0.67 | 0.62 | 0.69 | 0.76 | 0.79 | 0.79 | 0.25 | 0.34 | 0.34 | 1.46 | 1.38 | 1.37 | 0.84 | 0.83 | 0.82 | 0.85 |
| C₉ + Paraffin | 0.82 | 1.04 | 1.04 | 1.29 | 1.39 | 1.42 | 1.66 | 1.98 | 2.00 | 1.95 | 0.36 | 0.41 | 0.41 | 6.17 | 5.70 | 5.59 | 2.35 | 2.27 | 2.24 | 2.31 |
| Benzene | 2.93 | 2.76 | 2.74 | 2.66 | 2.65 | 2.61 | 2.35 | 2.48 | 2.47 | 2.50 | 21.79 | 3.03 | 2.98 | 2.08 | 2.12 | 2.13 | 2.47 | 2.53 | 2.50 | 2.48 |
| Toluene | 16.04 | 16.03 | 15.98 | 15.67 | 15.57 | 15.13 | 13.61 | 14.29 | 14.33 | 14.54 | 11.68 | 15.75 | 15.53 | 12.70 | 12.77 | 12.86 | 13.86 | 14.05 | 14.00 | 13.85 |
| Ethylbenzene | 2.41 | 2.48 | 2.50 | 2.55 | 2.68 | 2.67 | 2.58 | 2.81 | 2.90 | 2.96 | 2.04 | 2.83 | 2.83 | 3.13 | 3.11 | 3.15 | 3.01 | 3.08 | 3.14 | 3.12 |
| M,P-Xylene | 13.12 | 13.50 | 13.56 | 13.34 | 13.41 | 13.10 | 11.80 | 12.52 | 12.56 | 12.79 | 10.04 | 13.45 | 13.24 | 11.38 | 11.45 | 11.48 | 12.28 | 12.41 | 12.38 | 12.21 |
| Orthoxylene | 5.53 | 5.52 | 5.51 | 5.43 | 5.44 | 5.32 | 4.76 | 5.05 | 5.03 | 5.12 | 3.91 | 5.31 | 5.23 | 4.57 | 4.60 | 4.61 | 4.83 | 4.97 | 4.92 | 4.78 |
| C₉ + Aromatic | 16.73 | 18.16 | 18.44 | 18.91 | 19.48 | 19.65 | 25.24 | 21.70 | 20.32 | 20.74 | 14.42 | 9.42 | 19.25 | 21.50 | 21.95 | 21.79 | 21.36 | 21.45 | 21.59 | 21.24 |
| | | | | | | | | | | Totals | | | | | | | | | | |
| Paraffins | 21.20 | 22.37 | 21.89 | 21.90 | 22.10 | 21.73 | 20.79 | 22.55 | 22.85 | 21.75 | 13.55 | 17.81 | 17.31 | 30.20 | 29.96 | 29.49 | 23.76 | 23.77 | 23.16 | 24.48 |
| Aromatics | 56.76 | 58.45 | 58.73 | 58.56 | 59.22 | 58.47 | 60.34 | 58.85 | 57.62 | 58.66 | 63.88 | 59.79 | 59.08 | 55.38 | 56.01 | 56.02 | 57.82 | 58.48 | 58.54 | 57.68 |
| Total Yields | 77.96 | 80.82 | 80.62 | 80.46 | 81.32 | 80.20 | 81.13 | 81.40 | 80.47 | 80.41 | 77.43 | 77.60 | 76.39 | 85.58 | 85.97 | 85.51 | 81.58 | 82.25 | 81.70 | 82.16 |
| Octane No.* | 99.53 | 98.98 | 99.13 | 98.83 | 98.73 | 98.69 | 98.01 | 97.91 | 97.59 | 97.89 | 100.95 | 101.11 | 101.10 | 92.73 | 93.03 | 93.19 | 97.07 | 97.17 | 97.37 | 97.05 |

*As determined by mass spectrometry

TABLE III

| | LIQUID PRODUCT FROM TEST NO. 2 CATALYST A; FEED B | | | | | | | | | | | |
|---|---|---|---|---|---|---|---|---|---|---|---|---|
| Sample No. | 1 | 2 | 3 | 4 | 5 | 6 | 7 | 8 | 9 | 10 | 11 | 12 |
| Time on Oil, hrs | 7.76 | 17.49 | 21.43 | 31.36 | 41.28 | 45.13 | 53.11 | 61.04 | 64.61 | 76.53 | 88.69 | 92.12 |
| Outlet Temp., °F. | 930 | 930 | 930 | 930 | 930 | 930 | 930 | 930 | 930 | 930 | 930 | 930 |
| Component | Wt. % On Feed | | | | | | | | | | | |
| Ethane | 0.04 | 0.04 | 0.04 | 0.05 | 0.04 | 0.04 | 0.04 | 0.05 | 0.04 | 0.05 | 0.05 | 0.04 |
| Propane | 0.45 | 0.45 | 0.43 | 0.48 | 0.46 | 0.44 | 0.46 | 0.48 | 0.44 | 0.52 | 0.50 | 0.47 |
| i-Butane | 0.60 | 0.59 | 0.57 | 0.60 | 0.59 | 0.57 | 0.60 | 0.61 | 0.58 | 0.64 | 0.61 | 0.59 |
| n-Butane | 1.11 | 1.11 | 1.09 | 1.14 | 1.15 | 1.12 | 1.17 | 1.18 | 1.15 | 1.24 | 1.20 | 1.17 |
| i-Pentane | 2.29 | 2.27 | 2.23 | 2.22 | 2.28 | 2.24 | 2.29 | 2.28 | 2.25 | 2.34 | 2.29 | 2.25 |
| n-Pentane | 1.42 | 1.43 | 1.44 | 1.44 | 1.48 | 1.46 | 1.50 | 1.49 | 1.49 | 1.54 | 1.53 | 1.49 |
| i-Hexane | 3.20 | 3.31 | 3.24 | 3.38 | 3.31 | 3.29 | 3.33 | 3.34 | 3.28 | 3.58 | 3.56 | 3.32 |
| n-Hexane | 1.72 | 1.76 | 1.74 | 1.76 | 1.79 | 1.80 | 1.82 | 1.83 | 1.81 | 1.81 | 1.82 | 1.81 |
| MCP | 0.82 | 0.85 | 0.78 | 0.84 | 0.82 | 0.83 | 0.84 | 0.86 | 0.84 | 0.85 | 0.85 | 0.85 |
| i-Heptane | 5.52 | 5.71 | 5.28 | 5.65 | 5.66 | 5.57 | 5.77 | 5.76 | 5.58 | 5.79 | 5.66 | 5.68 |
| n-Heptane | 1.62 | 1.68 | 1.54 | 1.66 | 1.69 | 1.63 | 1.73 | 1.70 | 1.65 | 1.75 | 1.68 | 1.69 |
| i-Octane | 3.51 | 3.86 | 3.25 | 3.42 | 3.68 | 3.68 | 3.84 | 3.97 | 3.74 | 3.95 | 3.93 | 4.10 |
| n-Octane | 0.70 | 0.77 | 0.65 | 0.68 | 0.72 | 0.73 | 0.75 | 0.79 | 0.74 | 0.78 | 0.78 | 0.81 |
| $C_9$ + Paraffin | 1.14 | 1.39 | 0.97 | 1.12 | 1.33 | 1.33 | 1.45 | 1.60 | 1.49 | 1.78 | 1.73 | 1.92 |
| Benzene | 2.10 | 2.00 | 2.02 | 1.91 | 1.96 | 1.95 | 1.92 | 1.89 | 1.91 | 1.92 | 1.94 | 1.85 |
| Toluene | 11.99 | 11.82 | 11.81 | 11.84 | 11.62 | 11.61 | 11.47 | 11.35 | 11.35 | 11.51 | 11.61 | 11.39 |
| Ethylbenzene | 3.48 | 3.63 | 3.55 | 3.81 | 3.60 | 3.58 | 3.57 | 3.52 | 3.49 | 3.59 | 3.59 | 3.55 |
| M,P-Xylene | 11.65 | 11.81 | 11.79 | 11.87 | 11.82 | 11.81 | 11.69 | 11.59 | 11.44 | 11.71 | 11.77 | 11.67 |
| Orthoxylene | 4.07 | 4.05 | 4.09 | 4.63 | 4.00 | 3.97 | 3.90 | 3.84 | 3.78 | 3.90 | 3.85 | 3.88 |
| $C_9$ + Aromatic | 22.55 | 23.75 | 23.43 | 22.18 | 23.96 | 23.88 | 23.69 | 23.90 | 25.12 | 23.21 | 23.03 | 23.58 |
| | Totals | | | | | | | | | | | |
| Paraffins | 24.14 | 25.20 | 23.24 | 24.42 | 25.02 | 24.74 | 25.58 | 25.92 | 25.09 | 26.62 | 26.19 | 26.19 |
| Aromatics | 55.85 | 57.05 | 56.69 | 56.24 | 56.96 | 56.80 | 56.24 | 56.08 | 57.08 | 55.84 | 55.79 | 55.91 |
| Total Yields | 79.99 | 82.25 | 79.93 | 80.66 | 81.98 | 81.54 | 81.82 | 82.00 | 82.17 | 82.46 | 81.98 | 82.10 |
| Octane No.* | 99.39 | 99.04 | 99.45 | 99.45 | 99.20 | 99.16 | 98.94 | 98.63 | 98.75 | 98.52 | 98.72 | 98.60 |

*As determined by mass spectometry

TABLE IV

LIQUID PRODUCT FROM TEST NO. 3
CATALYST B (SULFIDED); FEED A

| Sample No. | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| Time on Oil, hrs | 7.97 | 17.93 | 21.81 | 31.78 | 41.70 | 45.48 | 55.60 | 65.52 | 69.24 | 79.19 | 89.10 | 92.99 | 102.94 | 112.84 | 116.76 | 126.76 | 136.63 | 140.49 |
| Outlet Temp., °F. | 930 | 930 | 930 | 930 | 930 | 930 | 930 | 930 | 930 | 930 | 930 | 930 | 950 | 950 | 950 | 910 | 910 | 910 |
| Component | | | | | | | Wt. % On Feed | | | | | | | | | | | |
| Ethane | 0.05 | 0.05 | 0.05 | 0.05 | 0.05 | 0.05 | 0.05 | 0.04 | 0.04 | 0.05 | 0.03 | 0.03 | 0.05 | 0.04 | 0.04 | 0.05 | 0.04 | 0.04 |
| Propane | 0.59 | 0.57 | 0.56 | 0.58 | 0.55 | 0.52 | 0.57 | 0.50 | 0.49 | 0.52 | 0.44 | 0.44 | 0.57 | 0.53 | 0.53 | 0.51 | 0.45 | 0.44 |
| i-Butane | 0.75 | 0.73 | 0.70 | 0.71 | 0.67 | 0.65 | 0.68 | 0.63 | 0.64 | 0.64 | 0.60 | 0.59 | 0.71 | 0.70 | 0.71 | 0.60 | 0.55 | 0.54 |
| n-Butane | 1.43 | 1.47 | 1.44 | 1.46 | 1.38 | 1.34 | 1.42 | 1.34 | 1.36 | 1.36 | 1.31 | 1.27 | 1.47 | 1.48 | 1.49 | 1.30 | 1.20 | 1.18 |
| i-Pentane | 2.69 | 2.66 | 2.57 | 2.60 | 2.50 | 2.46 | 2.53 | 2.44 | 2.52 | 2.47 | 2.46 | 2.40 | 2.58 | 2.61 | 2.63 | 2.33 | 2.21 | 2.17 |
| n-Pentane | 1.69 | 1.73 | 1.68 | 1.72 | 1.67 | 1.65 | 1.69 | 1.66 | 1.71 | 1.68 | 1.68 | 1.63 | 1.82 | 1.85 | 1.87 | 1.53 | 1.45 | 1.42 |
| i-Hexane | 3.62 | 3.80 | 3.42 | 3.60 | 3.49 | 3.62 | 3.71 | 3.63 | 3.86 | 3.60 | 3.66 | 3.69 | 3.56 | 3.55 | 3.54 | 3.73 | 3.61 | 3.52 |
| n-Hexane | 1.45 | 1.45 | 1.37 | 1.43 | 1.42 | 1.44 | 1.46 | 1.45 | 1.50 | 1.48 | 1.49 | 1.45 | 1.37 | 1.37 | 1.36 | 1.55 | 1.48 | 1.43 |
| MCP | 0.64 | 0.60 | 0.56 | 0.58 | 0.58 | 0.58 | 0.59 | 0.59 | 0.55 | 0.62 | 0.62 | 0.59 | 0.43 | 0.41 | 0.40 | 0.85 | 0.80 | 0.77 |
| i-Heptane | 4.15 | 3.99 | 3.74 | 3.87 | 3.82 | 3.84 | 3.94 | 3.89 | 4.05 | 4.10 | 4.07 | 3.94 | 2.71 | 2.61 | 2.55 | 5.54 | 5.22 | 5.05 |
| n-Heptane | 1.18 | 1.12 | 1.04 | 1.09 | 1.07 | 1.07 | 1.10 | 1.09 | 1.15 | 1.15 | 1.14 | 1.10 | 0.75 | 0.72 | 0.71 | 1.78 | 1.66 | 1.61 |
| i-Octane | 2.41 | 2.14 | 2.03 | 2.10 | 1.99 | 2.00 | 2.07 | 2.06 | 2.19 | 2.23 | 2.17 | 2.07 | 0.80 | 0.71 | 0.66 | 4.89 | 4.40 | 4.28 |
| n-Octane | 0.54 | 0.49 | 0.46 | 0.44 | 0.45 | 0.45 | 0.47 | 0.46 | 0.46 | 0.50 | 0.49 | 0.47 | 0.18 | 0.17 | 0.14 | 1.13 | 1.01 | 0.97 |
| C$_9$ + Paraffin | 1.04 | 0.51 | 0.93 | 1.02 | 1.04 | 1.12 | 1.39 | 3.01 | 0.66 | 0.59 | 0.57 | 0.51 | 0.13 | 0.12 | 0.16 | 3.21 | 2.65 | 4.71 |
| Benzene | 2.12 | 2.26 | 2.09 | 2.25 | 2.32 | 2.30 | 2.34 | 2.34 | 2.44 | 2.38 | 2.43 | 2.38 | 2.72 | 2.77 | 2.78 | 1.94 | 2.03 | 1.99 |
| Toluene | 12.21 | 13.02 | 12.31 | 12.83 | 13.00 | 12.88 | 12.94 | 12.85 | 13.25 | 13.13 | 13.29 | 13.07 | 14.22 | 14.36 | 14.34 | 11.48 | 11.95 | 11.66 |
| Ethylbenzene | 3.79 | 4.09 | 3.98 | 4.02 | 3.95 | 3.92 | 3.89 | 3.84 | 3.96 | 3.97 | 3.97 | 3.93 | 4.03 | 4.04 | 4.07 | 3.65 | 3.81 | 3.68 |
| M,P-Xylene | 11.86 | 12.74 | 12.34 | 12.43 | 12.27 | 12.10 | 12.03 | 11.83 | 12.12 | 12.10 | 12.19 | 12.07 | 12.83 | 12.92 | 12.85 | 10.73 | 11.08 | 10.80 |
| Orthoxylene | 4.61 | 5.15 | 5.01 | 5.06 | 4.99 | 4.94 | 4.91 | 4.85 | 4.94 | 4.94 | 4.98 | 4.94 | 5.13 | 5.15 | 5.14 | 4.43 | 4.60 | 4.47 |
| C$_9$ + Aromatic | 24.64 | 21.83 | 24.98 | 23.30 | 23.34 | 23.12 | 22.85 | 21.65 | 21.90 | 22.38 | 22.47 | 22.93 | 21.27 | 21.28 | 21.44 | 23.38 | 24.08 | 22.46 |
| | | | | | | | | Totals | | | | | | | | | | |
| Paraffins | 22.23 | 21.31 | 20.54 | 21.26 | 20.67 | 20.79 | 21.67 | 22.80 | 21.19 | 20.98 | 20.72 | 20.20 | 17.12 | 16.87 | 16.79 | 29.01 | 26.71 | 28.13 |
| Aromatics | 59.22 | 59.09 | 60.71 | 59.88 | 59.87 | 59.27 | 58.94 | 57.36 | 58.60 | 58.91 | 59.33 | 59.32 | 60.21 | 60.52 | 60.60 | 55.61 | 57.55 | 55.06 |
| Total Yields | 81.45 | 80.40 | 81.25 | 81.14 | 80.54 | 80.06 | 80.61 | 80.16 | 79.79 | 79.89 | 80.05 | 79.52 | 77.33 | 77.39 | 77.39 | 84.62 | 84.26 | 83.19 |
| Octane No.* | 98.69 | 99.53 | 99.63 | 99.56 | 99.56 | 99.56 | 99.34 | 99.38 | 99.24 | 99.21 | 99.42 | 99.59 | 101.73 | 101.93 | 102.01 | 95.06 | 95.62 | 95.63 |

*As determined by mass spectrometry

TABLE V

LIQUID PRODUCT FROM TEST NO. 4
CATALYST B (SULFIDED); FEED B

| Sample No. | 1 | 2 | 3 | 4 | 5 | 6 | 7 | 8 | 9 | 10 | 11 | 12 |
|---|---|---|---|---|---|---|---|---|---|---|---|---|
| Time on Oil, hrs | 7.47 | 16.82 | 20.67 | 30.60 | 40.52 | 44.46 | 54.38 | 64.29 | 68.22 | 78.09 | 87.46 | 90.90 |
| Outlet Temp., °F. | 930 | 930 | 930 | 930 | 930 | 930 | 930 | 930 | 930 | 930 | 930 | 930 |

| Component | Wt. % On Feed | | | | | | | | | | | |
|---|---|---|---|---|---|---|---|---|---|---|---|---|
| Ethane | 0.06 | 0.05 | 0.05 | 0.05 | 0.05 | 0.05 | 0.05 | 0.04 | 0.05 | 0.05 | 0.04 | 0.04 |
| Propane | 0.62 | 0.56 | 0.52 | 0.53 | 0.52 | 0.50 | 0.52 | 0.52 | 0.52 | 0.57 | 0.48 | 0.48 |
| i-Butane | 0.85 | 0.76 | 0.72 | 0.70 | 0.69 | 0.67 | 0.69 | 0.71 | 0.68 | 0.73 | 0.66 | 0.66 |
| n-Butane | 1.57 | 1.41 | 1.35 | 1.30 | 1.28 | 1.26 | 1.29 | 1.33 | 1.28 | 1.36 | 1.25 | 1.26 |
| i-Pentane | 3.03 | 2.71 | 2.62 | 2.53 | 2.50 | 2.48 | 2.54 | 2.61 | 2.50 | 2.60 | 2.45 | 2.50 |
| n-Pentane | 1.95 | 1.78 | 1.74 | 1.67 | 1.63 | 1.62 | 1.65 | 1.69 | 1.62 | 1.68 | 1.61 | 1.64 |
| i-Hexane | 3.09 | 4.02 | 4.08 | 3.78 | 3.66 | 3.66 | 3.71 | 3.80 | 3.66 | 3.75 | 3.60 | 3.80 |
| n-Hexane | 1.82 | 1.67 | 1.62 | 2.11 | 2.06 | 2.05 | 2.07 | 2.18 | 2.08 | 2.11 | 2.07 | 2.13 |
| MCP | 0.89 | 0.79 | 0.74 | 0.99 | 0.95 | 0.94 | 0.93 | 0.96 | 0.93 | 0.93 | 0.92 | 0.95 |
| i-Heptane | 6.33 | 4.86 | 4.61 | 6.07 | 5.99 | 5.97 | 5.92 | 6.13 | 6.02 | 5.91 | 5.82 | 6.04 |
| n-Heptane | 1.54 | 1.38 | 1.31 | 1.75 | 1.72 | 1.71 | 1.69 | 1.76 | 1.75 | 1.70 | 1.68 | 1.74 |
| i-Octane | 3.37 | 2.96 | 2.72 | 3.45 | 3.43 | 3.38 | 3.21 | 3.57 | 3.48 | 3.46 | 3.39 | 3.49 |
| n-Octane | 0.75 | 0.66 | 0.60 | 0.67 | 0.67 | 0.66 | 0.65 | 0.70 | 0.68 | 0.68 | 0.67 | 0.69 |
| $C_9$ + Paraffin | 1.31 | 1.14 | 0.98 | 1.20 | 1.03 | 0.96 | 0.92 | 1.13 | 1.13 | 1.13 | 1.03 | 1.17 |
| Benzene | 2.07 | 1.84 | 1.84 | 1.85 | 1.89 | 1.92 | 1.93 | 1.96 | 1.88 | 1.91 | 1.89 | 1.91 |
| Toluene | 13.00 | 11.76 | 11.62 | 11.76 | 11.89 | 12.03 | 11.98 | 12.31 | 11.82 | 12.01 | 11.89 | 11.94 |
| Ethylbenzene | 3.71 | 3.38 | 3.35 | 3.46 | 3.54 | 3.60 | 3.59 | 2.80 | 3.55 | 3.64 | 3.55 | 3.56 |
| M,P-Xylene | 13.43 | 12.27 | 12.18 | 12.06 | 12.13 | 12.21 | 12.23 | 10.51 | 12.10 | 12.31 | 12.19 | 12.16 |
| Orthoxylene | 4.68 | 4.30 | 4.22 | 4.25 | 4.33 | 4.37 | 4.38 | 4.46 | 4.34 | 4.42 | 4.36 | 4.31 |
| $C_9$ + Aromatic | 15.59 | 22.16 | 21.69 | 20.34 | 20.92 | 20.99 | 21.06 | 21.94 | 21.09 | 20.82 | 21.44 | 21.35 |

| Totals | | | | | | | | | | | | |
|---|---|---|---|---|---|---|---|---|---|---|---|---|
| Paraffins | 27.17 | 24.74 | 23.66 | 26.80 | 26.17 | 25.90 | 25.85 | 27.12 | 26.38 | 26.66 | 25.66 | 26.59 |
| Aromatics | 52.47 | 55.73 | 54.91 | 53.72 | 54.71 | 55.12 | 55.18 | 53.98 | 54.78 | 55.12 | 55.34 | 55.24 |
| Total Yields | 79.64 | 80.47 | 78.57 | 80.52 | 80.88 | 81.02 | 81.03 | 81.10 | 81.16 | 81.78 | 81.00 | 81.83 |
| Octane No.* | 96.89 | 97.00 | 97.59 | 97.74 | 97.95 | 98.28 | 98.42 | 98.11 | 97.89 | 98.12 | 98.03 | 98.07 |

*As determined by mass spectrometry

For this preparation, 100 gm of Aero 1000 alumina, obtained from the American Cyanamid Company, were used in the form of 20-to-45-mesh (U.S. Sieve Series) material. To this alumina was added an impregnating solution that had been prepared by adding 1.0 gm of $H_2PtCl_6$, 0.5 gm of $PdCl_2$, 60 drops of concentrated $HNO_3$ (about 70 wt.% $HNO_3$), 4.1 gm of the rhenium-containing solution described in Example I, and 0.6 gm of 37 wt.% HCl solution to 90 ml of distilled water.

The impregnated alumina was dried and calcined as described in Example I.

Catalyst C was prepared to contain 0.4 wt.% platinum, 0.4 wt.% rhenium, 0.3 wt.% palladium, and 0.8 wt.% combined chlorine.

EXAMPLE V

A third embodiment of the catalyst employed in the process of the present invention was prepared. It is identified hereinafter as Catalyst D.

For this preparation, 100 gm of Aero 1000 alumina were used in the form of 20-to-45-mesh (U.S. Sieve Series) material. To this solution was added an impregnating solution that had been prepared by incorporating 1.0 gm of $H_2PtCl_6$, 1.0 gm of $PdCl_2$, 3.0 gm of a $Pd(NO_3)_2$ solution containing 10 wt.% palladium, 90 drops of concentrated $HNO_3$ (70 wt.% $HNO_3$), and 4.1 gm of the rhenium-containing solution that is described in Example I. Sufficient distilled water was added to the solution to bring its total weight to 100 gm.

The resulting impregnated alumina was dried and calcined as discussed hereinabove in Example I.

Catalyst D was prepared to contain 0.4 wt.% platinum, 0.4 wt.% rhenium, 0.9 wt.% palladium, and 0.8 wt.% combined chlorine.

EXAMPLE VI

Catalysts B, C, and D, in the unsulfided form, were tested in bench-scale test units for their ability to reform Feed A. The test units are described in Example III hereinabove. Catalyst B, in the unsulfided form, was tested in Test No. 5; Catalyst C, in Test No. 6; and Catalyst D, in Test No. 7. Operating conditions were the same as those employed in the tests described in Example III.

The results obtained from Tests Nos. 5 through 7 are presented hereinafter in Tables VI, VII, and VIII, respectively.

Figure 3:
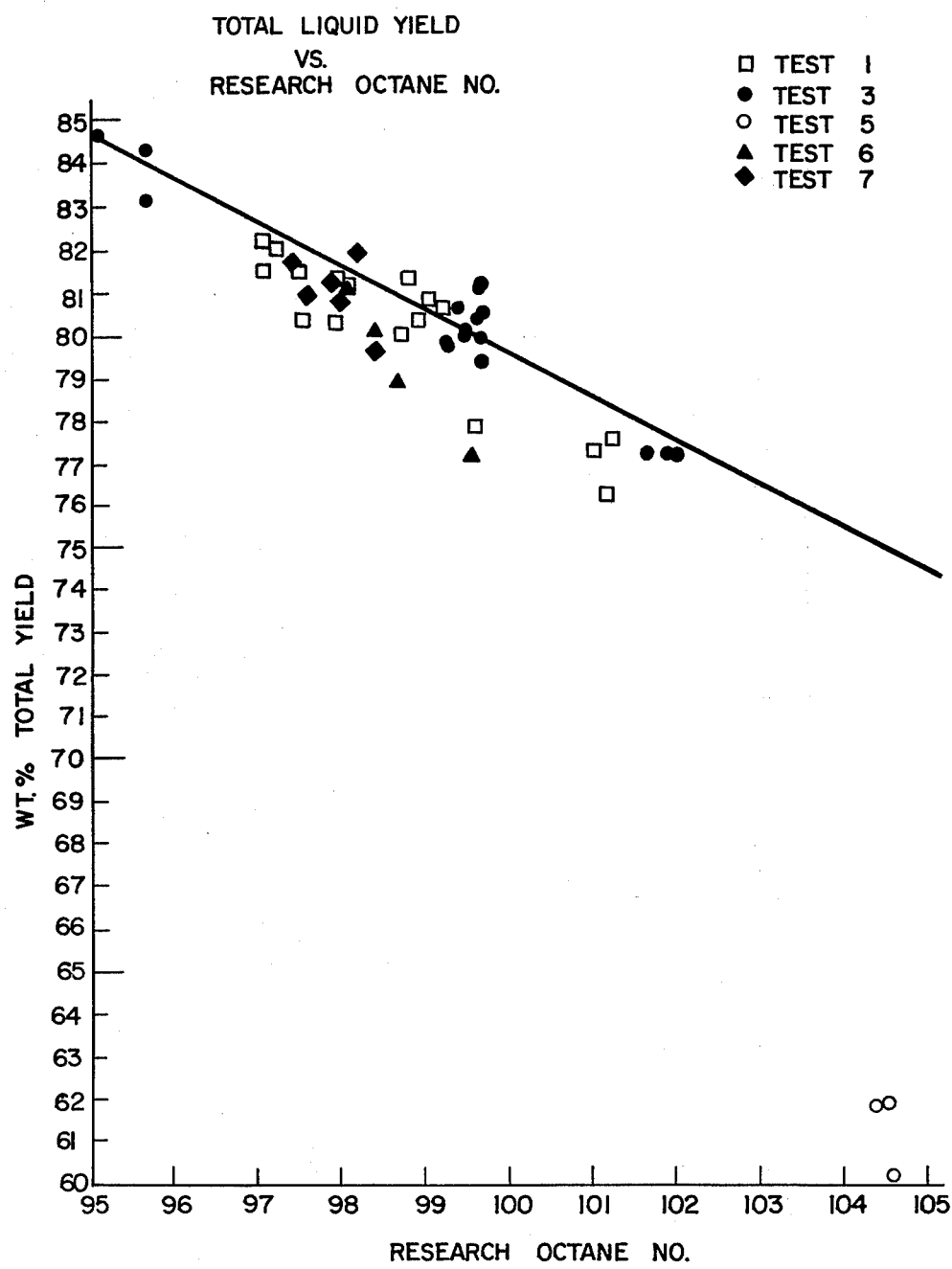
FIGS. 3, 4, and 5 provide the relationship between total liquid yield and research octane number for both the palladium-containing catalyst and the catalyst that does not contain any palladium, the relationship between aromatics yield and research octane number, and the relationship between paraffin yield and research octane number, respectively.
Figure 4:
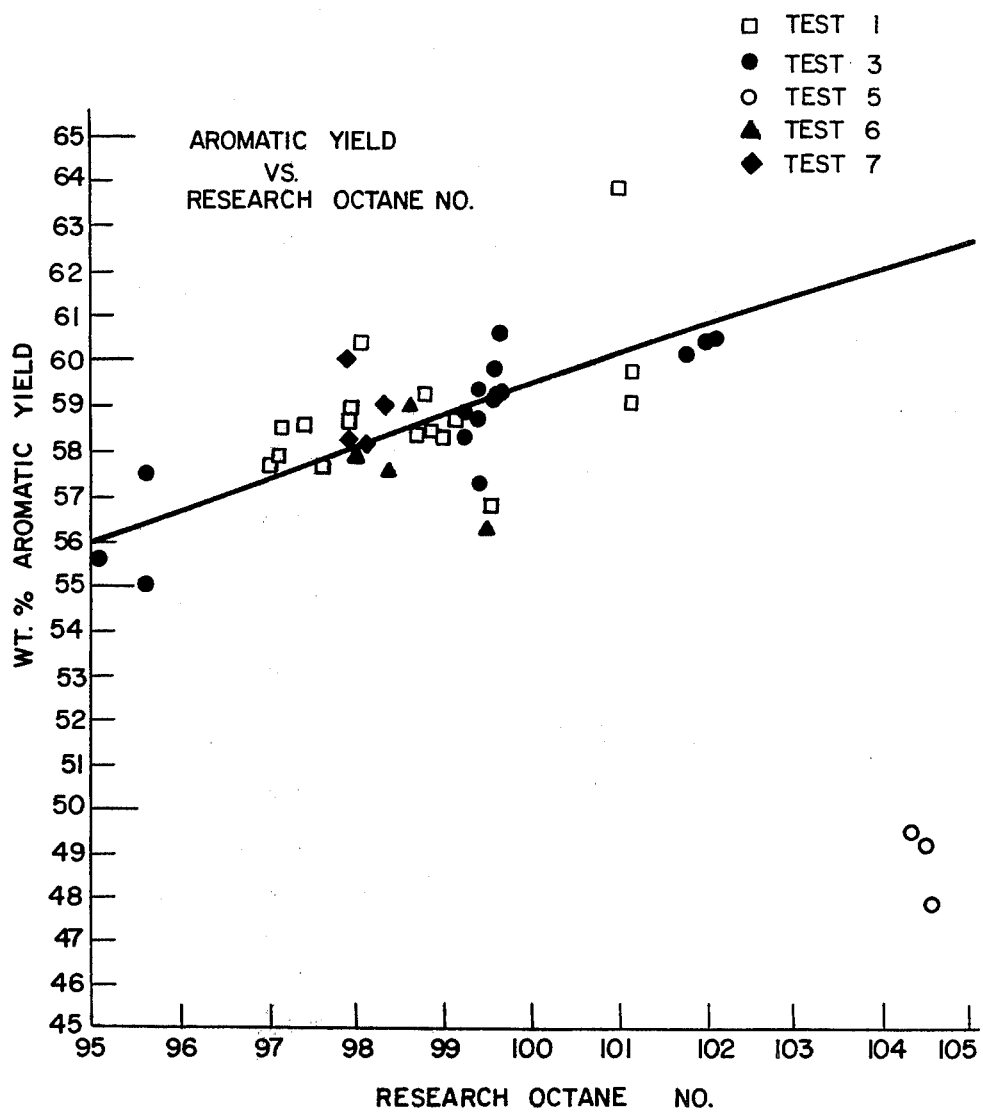
Figure 5:
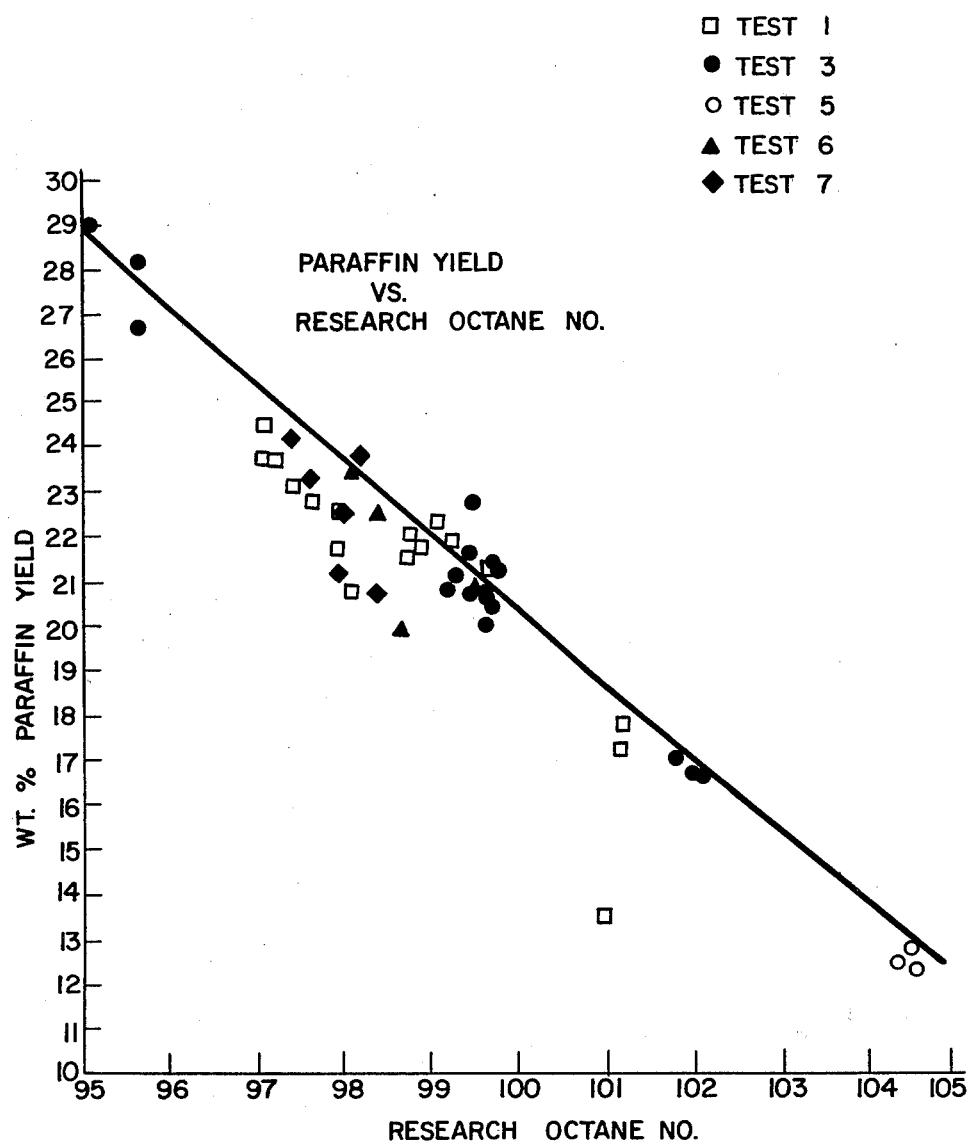

The results of these tests, i.e., Tests Nos. 5, 6, and 7, and the results of Tests Nos. 1 and 3 are presented in accompanying FIGS. 3, 4, and 5.

FIG. 3 demonstrates that the total liquid yields provided by the embodiments of the catalyst that is employed in the process of the present invention are similar to the total liquid yield provided by a sulfided platinum-rhenium catalyst, Catalyst B. However, they are substantially greater than the total liquid yield provided by the unsulfided platinum-rhenium catalyst. Furthermore, both the yield of aromatics, as shown in FIG. 4, and the yield of paraffins, as shown in FIG. 5, provided by the embodiment of the catalyst that is employed in the process of the present invention are substantially the same as the yields of the respective components produced with the sulfided platinum-rhenium catalyst. Also note that the unsulfided platinum-rhenium catalyst provides a substantially lower aromatics yield than the sulfided platinum-rhenium catalyst.

TABLE VI

LIQUID PRODUCT FROM TEST NO. 5
CATALYST B (UNSULFIDED); FEED A

| Sample No. | 1 | 2 | 3 | 4 |
|---|---|---|---|---|
| Time on Oil, hrs | 7.22 | 16.53 | 20.60 | 28.31 |
| Outlet Temp., °F. | 930 | 930 | 930 | 930 |
| Component | Wt. % on Feed | | | |
| Ethane | 0.05 | 0.07 | 0.05 | 0.06 |
| Propane | 0.51 | 0.65 | 0.59 | 0.66 |
| i-Butane | 0.63 | 0.77 | 0.74 | 0.78 |
| n-Butane | 1.47 | 1.70 | 1.65 | 1.76 |
| i-Pentane | 2.15 | 2.55 | 2.56 | 2.61 |
| n-Pentane | 1.62 | 1.88 | 1.89 | 1.92 |
| i-Hexane | 1.93 | 2.56 | 2.70 | 2.68 |
| n-Hexane | 0.69 | 0.92 | 0.97 | 0.96 |
| MCP | 0.09 | 0.12 | 0.16 | 0.16 |
| i-Heptane | 0.45 | 0.83 | 0.93 | 0.93 |
| n-Heptane | 0.11 | 0.19 | 0.22 | 0.22 |
| i-Octane | 0.03 | 0.08 | 0.11 | 0.10 |
| n-Octane | 0.00 | 0.00 | 0.01 | 0.01 |
| $C_9$ + Paraffin | 0.00 | 0.00 | 0.00 | 0.00 |
| Benzene | 7.16 | 6.14 | 5.93 | 6.18 |
| Toluene | 20.48 | 20.47 | 20.38 | 20.80 |
| Ethylbenzene | 0.11 | 0.43 | 0.52 | 0.53 |
| M,P-Xylene | 8.33 | 9.66 | 10.76 | 9.99 |
| Orthoxylene | 5.00 | 5.57 | 5.71 | 5.69 |
| $C_9$ + Aromatic | 3.93 | 5.53 | 6.11 | 5.98 |
| | Totals | | | |
| Paraffins | 9.72 | 12.32 | 12.58 | 12.84 |
| Aromatics | 45.02 | 47.80 | 49.41 | 49.18 |
| Total Yields | 54.74 | 60.12 | 61.99 | 62.02 |
| Octane No.* | 105.56 | 104.56 | 104.35 | 104.48 |

*As determined by mass spectrometry

TABLE VII

LIQUID PRODUCT FROM TEST NO. 6
CATALYST C; FEED A

| Sample No. | 1 | 2 | 3 | 4 |
|---|---|---|---|---|
| Time on Oil, hrs | 8.18 | 18.33 | 22.18 | 32.03 |
| Outlet Temp., °F. | 930 | 930 | 930 | 930 |
| Component | Wt. % on Feed | | | |
| Ethane | 0.06 | 0.05 | 0.05 | 0.05 |
| Propane | 0.55 | 0.45 | 0.48 | 0.49 |
| i-Butane | 0.63 | 0.52 | 0.58 | 0.57 |
| n-Butane | 1.33 | 1.08 | 1.20 | 1.17 |
| i-Pentane | 2.41 | 2.03 | 2.30 | 2.21 |
| n-Pentane | 1.67 | 1.35 | 1.50 | 1.44 |
| i-Hexane | 3.77 | 3.27 | 3.65 | 3.57 |
| n-Hexane | 1.44 | 1.26 | 1.42 | 1.37 |
| MCP | 0.58 | 0.55 | 0.63 | 0.62 |
| i-Heptane | 3.76 | 3.65 | 4.38 | 4.20 |
| n-Heptane | 1.06 | 1.15 | 1.32 | 1.26 |
| i-Octane | 2.21 | 2.61 | 3.07 | 3.55 |
| n-Octane | 0.49 | 0.57 | 0.67 | 0.69 |
| $C_9$ + Paraffin | 0.91 | 1.36 | 1.30 | 2.07 |
| Benzene | 3.00 | 2.39 | 2.65 | 2.54 |
| Toluene | 15.51 | 20.15 | 14.67 | 14.06 |
| Ethylbenzene | 2.45 | 2.44 | 2.79 | 2.78 |
| M,P-Xylene | 12.45 | 11.17 | 12.53 | 12.06 |
| Orthoxylene | 5.38 | 4.67 | 5.17 | 4.99 |
| $C_9$ + Aromatic | 17.47 | 18.24 | 19.76 | 21.50 |
| | Totals | | | |
| Paraffins | 20.86 | 19.90 | 22.53 | 23.26 |
| Aromatics | 56.27 | 59.07 | 57.58 | 57.94 |
| Total Yields | 77.13 | 78.97 | 80.11 | 81.20 |
| Octane No.* | 99.46 | 98.60 | 98.34 | 98.00 |

*As determined by mass spectrometry

TABLE VIII

LIQUID PRODUCT FROM TEST NO. 7
CATALYST D; FEED A

| Sample No. | 1 | 2 | 3 | 4 | 5 | 6 |
|---|---|---|---|---|---|---|
| Time on Oil, hrs | 8.06 | 17.45 | 21.77 | 31.81 | 41.22 | 44.54 |
| Outlet Temp., °F. | 930 | 930 | 930 | 930 | 930 | 930 |
| Component | Wt. % on Feed | | | | | |
| Ethane | 0.05 | 0.04 | 0.04 | 0.05 | 0.30 | 0.05 |
| Propane | 0.50 | 0.47 | 0.43 | 0.49 | 0.39 | 0.51 |
| i-Butane | 0.64 | 0.63 | 0.58 | 0.62 | 0.54 | 0.63 |
| n-Butane | 1.21 | 1.21 | 1.11 | 1.20 | 1.08 | 1.21 |
| i-Pentane | 2.32 | 2.37 | 2.18 | 2.34 | 2.16 | 2.30 |
| n-Pentane | 1.45 | 1.47 | 1.36 | 1.46 | 1.37 | 1.46 |
| i-Hexane | 3.28 | 3.52 | 3.19 | 3.65 | 3.37 | 3.63 |
| n-Hexane | 1.28 | 1.36 | 1.27 | 1.38 | 1.33 | 1.39 |
| MCP | 0.56 | 0.61 | 0.55 | 0.65 | 0.62 | 0.62 |
| i-Heptane | 3.89 | 4.18 | 4.07 | 4.54 | 4.33 | 4.43 |
| n-Heptane | 1.18 | 1.22 | 1.24 | 1.29 | 1.25 | 1.36 |
| i-Octane | 2.61 | 3.08 | 3.00 | 3.48 | 3.38 | 3.48 |
| n-Octane | 0.58 | 0.69 | 0.66 | 0.78 | 0.75 | 0.79 |
| $C_9$ + Paraffin | 1.20 | 1.69 | 1.48 | 1.85 | 2.49 | 2.35 |
| Benzene | 2.34 | 2.38 | 2.16 | 2.37 | 2.31 | 2.37 |
| Toluene | 19.10 | 14.13 | 13.03 | 14.24 | 13.82 | 14.01 |
| Ethylbenzene | 2.63 | 2.81 | 2.63 | 2.90 | 2.85 | 2.91 |
| M,P-Xylene | 11.78 | 12.59 | 11.81 | 12.82 | 12.45 | 12.54 |
| Orthoxylene | 4.71 | 4.89 | 4.59 | 5.01 | 4.79 | 4.82 |
| $C_9$ + Aromatic | 18.48 | 21.49 | 25.90 | 20.85 | 21.36 | 20.98 |
| | Totals | | | | | |
| Paraffins | 20.77 | 22.54 | 21.18 | 23.79 | 23.36 | 24.20 |
| Aromatics | 59.02 | 58.29 | 60.11 | 58.18 | 57.58 | 56.63 |
| Total Yields | 79.79 | 80.83 | 81.29 | 81.97 | 80.94 | 80.83 |
| Octane No.* | 98.33 | 97.93 | 97.90 | 98.12 | 97.56 | 97.34 |

*As determined by mass spectrometry

The above examples show that the catalyst that is employed in the process of the present invention, i.e., a catalyst that contains a small amount of palladium in addition to platinum and rhenium, while providing a slightly smaller octane number than the conventional sulfided platinum-rhenium-alumina catalyst, provides yields that are substantially equivalent to those provided by the conventional sulfided platinum-rhenium-alumina catalyst. However, the catalyst that is employed in the process of the present invention does not require presulfiding to control the initial hydrocracking. Moreover, the catalyst that is employed in the process of the present invention performs satisfactorily when used to reform a feedstock containing a substantial amount of sulfur, e.g., 35 ppm sulfur.

In view of the above, the process of the present invention provides an improvement over the prior art reforming process employing the conventional sulfided platinum-rhenium-alumina catalyst. No presulfiding of the catalyst is required and a feedstock containing up to 50 ppm of sulfur can be reformed by means of the process of the present invention.

What is claimed is:

1. An improved process for the reforming of a hydrocarbon stream selected from the group consisting of naphthas and hydrocarbon fractions boiling in the gasoline boiling range, which process comprises contacting said hydrocarbon stream under reforming conditions and in the presence of hydrogen with a catalyst which comprises platinum, rhenium, a small amount of palladium, and combined halogen on a refractory inorganic oxide and which has not been presulfided.

2. The process of claim 1, wherein said small amount of palladium in said catalyst is within the range of about 0.05 wt.% to about 1 wt.%, calculated as the element and based upon the weight of the catalyst.

3. The process of claim 1, wherein said hydrocarbon stream contains 0 to about 50 ppm sulfur by weight.

4. The process of claim 1, wherein said catalyst comprises about 0.05 wt.% to about 1 wt.% platinum, about 0.03 wt.% to about 1 wt.% rhenium, each being calculated as the element, and about 0.1 wt.% to about 1 wt.% combined halogen, all calculations being based upon the weight of the catalyst, and wherein said refractory inorganic oxide is gamma-alumina, eta-alumina, or mixtures thereof.

5. The process of claim 1, wherein said reforming conditions comprise an inlet temperature within the range of about 900° F. (482° C.) to about 1,020° F. (549° C.), a pressure within the range of about 50 psig (446 KPa) to about 1,000 psig (6,996 KPa), a WHSV within the range of about 0.5 weight unit of hydrocarbon per hour per weight unit of catalyst to about 10 weight units of hydrocarbon per hour per weight unit of catalyst, and a hydrogen addition rate within the range of about 1,500 SCFB (267 m$^3$/m$^3$) to about 15,000 SCFB (2,670 m$^3$/m$^3$).

6. The process of claim 1, wherein said refractory inorganic oxide of said catalyst is gamma-alumina, eta-alumina, or mixtures thereof.

7. The process of claim 2, wherein said hydrocarbon stream contains 0 to about 50 ppm sulfur by weight.

8. The process of claim 2, wherein said catalyst comprises about 0.05 wt.% to about 1 wt.% platinum, about 0.03 wt.% to about 1 wt.% rhenium, each being calculated as the element, and about 0.1 wt.% to about 1 wt.% combined halogen, all calculations being based upon the weight of the catalyst, and wherein said refractory inorganic oxide is gamma-alumina, eta-alumina, or mixtures thereof.

9. The process of claim 2, wherein said reforming conditions comprise an inlet temperature within the range of about 900° F. (482° C.) to about 1,020° F. (549° C.), a pressure within the range of about 50 psig (446 KPa) to about 1,000 psig (6,996 KPa), a WHSV within the range of about 0.5 weight unit of hydrocarbon per hour per weight unit of catalyst to about 10 weight units of hydrocarbon per hour per weight unit of catalyst, and a hydrogen addition rate within the range of about 1,500 SCFB (267 m$^3$/m$^3$) to about 15,000 SCFB (2,670 m$^3$/m$^3$).

10. The process of claim 3, wherein said catalyst comprises about 0.05 wt.% to about 1 wt.% platinum, about 0.03 wt.% to about 1 wt.% rhenium, each being calculated as the element, and about 0.1 wt.% to about 1 wt.% combined halogen, all calculations being based upon the weight of the catalyst, and wherein said refractory inorganic oxide is gamma-alumina, eta-alumina, or mixtures thereof.

11. The process of claim 3, wherein said reforming conditions comprise an inlet temperature within the range of about 900° F. (482° C.) to about 1,020° F. (549° C.), a pressure within the range of about 50 psig (446 KPa) to about 1,000 psig (6,996 KPa), a WHSV within the range of about 0.5 weight unit of hydrocarbon per hour per weight unit of catalyst to about 10 weight units of hydrocarbon per hour per weight unit of catalyst, and a hydrogen addition rate within the range of about 1,500 SCFB (267 m$^3$/m$^3$) to about 15,000 SCFB (2,670 m$^3$/m$^3$).

12. The process of claim 4, wherein said reforming conditions comprise an inlet temperature within the range of about 900° F. (482° C.) to about 1,020° F. (549° C.), a pressure within the range of about 50 psig (446 KPa) to about 1,000 psig (6,996 KPa), a WHSV within the range of about 0.5 weight unit of hydrocarbon per hour per weight unit of catalyst to about 10 weight units of hydrocarbon per hour per weight unit of catalyst, and a hydrogen addition rate within the range of about 1,500 SCFB (267 m$^3$/m$^3$) to about 15,000 SCFB (2,670 m$^3$/m$^3$).

13. The process of claim 7, wherein said catalyst comprises about 0.05 wt.% to about 1 wt.% platinum, about 0.03 wt.% to about 1 wt.% rhenium, each being calculated as the element, and about 0.1 wt.% to about 1 wt.% combined halogen, all calculations being based upon the weight of the catalyst, and wherein said refractory inorganic oxide is gamma-alumina, eta-alumina, or mixtures thereof.

14. The process of claim 7, wherein said reforming conditions comprise an inlet temperature within the range of about 900° F. (482° C.) to about 1,020° F. (549° C. ), a pressure within the range of about 50 psig (446 KPa) to about 1,000 psig (6,996 KPa), a WHSV within the range of about 0.5 weight unit of hydrocarbon per hour per weight unit of catalyst to about 10 weight units of hydrocarbon per hour per weight unit of catalyst, and a hydrogen addition rate within the range of about 1,500 SCFB (267 m$^3$/m$^3$) to about 15,000 SCFB (2,670 m$^3$/m$^3$).

15. The process of claim 8, wherein said reforming conditions comprise an inlet temperature within the range of about 900° F. (482° C.) to about 1,020° F. (549° C.), a pressure within the range of about 50 psig (446 KPa) to about 1,000 psig (6,996 KPa), a WHSV within the range of about 0.5 weight unit of hydrocarbon per hour per weight unit of catalyst to about 10 weight units of hydrocarbon per hour per weight unit of catalyst, and a hydrogen addition rate within the range of about 1,500 SCFB (267 m$^3$/m$^3$) to about 15,000 SCFB (2,670 m$^3$/m$^3$).

16. The process of claim 10, wherein said reforming conditions comprise an inlet temperature within the range of about 900° F. (482° C.) to about 1,020° F. (549° C.), a pressure within the range of about 50 psig (446 KPa) to about 1,000 psig (6,996 KPa), a WHSV within the range of about 0.5 weight unit of hydrocarbon per hour per weight unit of catalyst to about 10 weight units of hydrocarbon per hour per weight unit of catalyst, and a hydrogen addition rate within the range of about 1,500 SCFB (267 m$^3$/m$^3$) to about 15,000 SCFB (2,670 m$^3$/m$^3$).

17. The process of claim 13, wherein said reforming conditions comprise an inlet temperature within the range of about 900° F. (482° C.) to about 1,020° F. (549° C.), a pressure within the range of about 50 psig (446 KPa) to about 1,000 psig (6,996 KPa), a WHSV within the range of about 0.5 weight unit of hydrocarbon per hour per weight unit of catalyst to about 10 weight units of hydrocarbon per hour per weight unit of catalyst, and a hydrogen addition rate within the range of about 1,500 SCFB (267 m$^3$/m$^3$) to about 15,000 SCFB (2,670 m$^3$/m$^3$).

18. The process of claim 17, wherein said hydrocarbon stream contains 0 to about 35 ppm sulfur by weight.

19. In a process for the reforming of a hydrocarbon stream selected from the group consisting of naphthas and hydrocarbon fractions boiling in the gasoline boiling range wherein said stream is contacted under reforming conditions and in the presence of hydrogen with a catalyst comprising platinum, rhenium, and a combined halogen on a refractory inorganic oxide, the improvement which comprises a catalyst which has not been presulfided and which contains a small amount of palladium.

20. The process of claim 19, wherein the palladium is present in said catalyst in an amount within the range of about 0.05 wt.% to about 1 wt.%, calculated as the element and based upon the weight of said catalyst.

* * * * *

UNITED STATES PATENT OFFICE
CERTIFICATE OF CORRECTION

Patent No. 4,261,811                    Dated April 14, 1981

Inventor(s) Regis J. Pellet, Michael J. Gradassi and Ralph J. Bertolacini

It is certified that error appears in the above-identified patent and that said Letters Patent are hereby corrected as shown below:

Column 4, line 39, "[A] (7nm) to about 200 A" should be --[Å] (7nm) to about 200 Å--.

Column 4, lines 49-50, "5 A (0.5nm) to about 15 A (1.5 nm)" should be --5 Å (0.5 nm) to about 15 Å (1.5 nm)--.

Table IV, last number in column headed Sample No. 1, "98.69" should be --98.68--.

Signed and Sealed this

Fourth Day of August 1981

[SEAL]

*Attest:*

*Attesting Officer*

GERALD J. MOSSINGHOFF

*Commissioner of Patents and Trademarks*